(12) United States Patent
Yang et al.

(10) Patent No.: US 12,211,315 B2
(45) Date of Patent: Jan. 28, 2025

(54) HUMAN FACE AND HAND ASSOCIATION DETECTING METHOD AND A DEVICE, AND STORAGE MEDIUM

(71) Applicant: Beijing Sensetime Technology Development Co., Ltd., Beijing (CN)

(72) Inventors: Kunlin Yang, Beijing (CN); Kun Yan, Beijing (CN); Jun Hou, Beijing (CN); Shuai Yi, Beijing (CN)

(73) Assignee: Beijing Sensetime Technology Development Co., Ltd, Beijing (CN)

(*) Notice: Subject to any disclaimer, the term of this patent is extended or adjusted under 35 U.S.C. 154(b) by 858 days.

(21) Appl. No.: 17/362,037

(22) Filed: Jun. 29, 2021

(65) Prior Publication Data

US 2021/0326587 A1 Oct. 21, 2021

Related U.S. Application Data

(63) Continuation of application No. PCT/CN2019/120901, filed on Nov. 26, 2019.

(30) Foreign Application Priority Data

Sep. 18, 2019 (CN) .......................... 201910882139.6

(51) Int. Cl.
*G06V 40/16* (2022.01)
*G06N 3/08* (2023.01)
(Continued)

(52) U.S. Cl.
CPC ............ *G06V 40/173* (2022.01); *G06N 3/08* (2013.01); *G06T 3/40* (2013.01); *G06T 5/50* (2013.01);
(Continued)

(58) Field of Classification Search
CPC .... G06V 40/173; G06V 10/764; G06V 10/82; G06V 40/107; G06V 40/161;
(Continued)

(56) References Cited

U.S. PATENT DOCUMENTS

| 2012/0051651 A1* | 3/2012 | Yamaoka | G06V 40/10 |
| | | | 382/195 |
| 2019/0171870 A1 | 6/2019 | Vajda et al. | |
| 2020/0250462 A1* | 8/2020 | Yang | G06N 3/08 |

FOREIGN PATENT DOCUMENTS

| CN | 103488299 A | 1/2014 |
| CN | 108460362 A | 8/2018 |

(Continued)

OTHER PUBLICATIONS

International Patent Application No. PCT/CN2019/120901; Int'l Search Report; dated Jun. 18, 2020; 2 pages.
(Continued)

*Primary Examiner* — Phuoc Tran
(74) *Attorney, Agent, or Firm* — BakerHostetler (57) ABSTRACT

The present disclosure relates to a method and apparatus for association detection for a human face and a human hand, an electronic apparatus and a storage medium. The method comprises: acquiring a first image, the first image being an image of a human object; performing feature extraction on the first image to obtain a first feature map of multiple dimensions; performing a feature fusion processing on the first feature map of multiple dimensions to obtain a second feature map of multiple dimensions, the dimensions of the second feature map corresponding to the dimensions of the first feature map in a one-to-one manner; detecting, on the basis of the obtained second feature map of multiple dimensions, a human face position and a human hand position associated with the same human object in the first image.
(Continued)

The embodiment of the present disclosure enables easy and convenient association detection for human face and human hand.

20 Claims, 5 Drawing Sheets

(51) Int. Cl.
*G06T 3/40* (2006.01)
*G06T 5/50* (2006.01)
*G06V 10/764* (2022.01)
*G06V 10/82* (2022.01)
*G06V 40/10* (2022.01)

(52) U.S. Cl.
CPC ............ *G06V 10/764* (2022.01); *G06V 10/82* (2022.01); *G06V 40/107* (2022.01); *G06V 40/161* (2022.01); *G06V 40/168* (2022.01); *G06T 2207/20016* (2013.01); *G06T 2207/20221* (2013.01)

(58) Field of Classification Search
CPC ...... G06V 40/168; G06V 10/462; G06N 3/08; G06N 3/045; G06T 3/40; G06T 5/50; G06T 2207/20016; G06T 2207/20221
See application file for complete search history.

(56) References Cited

FOREIGN PATENT DOCUMENTS

| | | |
|---|---|---|
| CN | 108764164 A | 11/2018 |
| CN | 109508681 A | 3/2019 |
| CN | 109614876 A | 4/2019 |
| CN | 109711273 A | 5/2019 |
| CN | 109886066 A | 6/2019 |
| CN | 110084292 A | 8/2019 |
| EP | 3493105 A1 | 6/2019 |

OTHER PUBLICATIONS

Lin et al.; "Feature Pyramid Networks for Object Detection"; IEEE Conf. on Computer Vision and Pattern Recognition; 2017; p. 936-944.

* cited by examiner

HUMAN FACE AND HAND ASSOCIATION DETECTING METHOD AND A DEVICE, AND STORAGE MEDIUM

CROSS-REFERENCE TO RELATED APPLICATION

The present disclosure is a continuation of and claims priority under 35 U.S.C. § 120 to PCT Application No. PCT/CN2019/120901, filed on Nov. 26, 2019, which claims the priority of Chinese Patent Application entitled "Human Face and Hand Association Detecting Method and Device, Electronic Apparatus, and Storage Medium" filed to National Intellectual Property Administration, PRC, on Sep. 18, 2019, with the Application No. 201910882139.6. All the above referenced priority documents are hereby incorporated by reference in their entireties.

TECHNICAL FIELD

The disclosure relates to the technical field of computer vision, in particular, to a human face and hand association detecting method and device, an electronic apparatus, and a storage medium.

BACKGROUND

The association of human body, face, and hand refers to the association between the detected human face and hand, so that an operation performed by the hand can be matched with a specific person through the association information.

Because human face is far apart from human hand in a human body, it is impossible to associate them directly through position information. Therefore, in the prior art, key point technology and object detection technology are generally used to associate the corresponding human face frame and hand frame.

SUMMARY

The present disclosure provides a technical solution for detecting human faces and hands in image processing.

According to an aspect of the present disclosure, there is provided a human face and hand association detecting method, comprising: acquiring a first image, the first image being an image of a human object; performing feature extraction on the first image to obtain first feature maps of multiple scales; performing feature fusion on the first feature maps of multiple scales to obtain second feature maps of multiple scales, wherein the scales of the second feature maps are in one-to-one correspondence with the scales of the first feature maps; and detecting associated human face position and hand position for the same human object in the first image, based on the obtained second feature maps of multiple scales.

According to a second aspect of the present disclosure, there is provided a human face and hand association detecting device, comprising: an acquisition module, configured to acquire a first image, the first image being an image of a human object; a feature extraction module, configured to perform feature extraction on the first image to obtain first feature maps of multiple scales; a fusion module, configured to perform feature fusion on the first feature maps of multiple scales to obtain second feature maps of multiple scales, wherein the scales of the second feature maps are in one-to-one correspondence with the scales of the first feature maps; and a detection module, configured to detect associated human face position and hand position for the same human object in the first image, based on the obtained second feature maps of multiple scales.

According to a third aspect of the present disclosure, there is provided an electronic apparatus, comprising a processor, and a memory for storing processor-executable instructions, wherein the processor is configured to invoke the instructions stored in the memory, to execute the method according to any one of the first aspect.

According to a fourth aspect of the present disclosure, there is provided a computer-readable storage medium, having stored thereon computer program instructions which, when executed by a processor, execute the method according to any one of the first aspect.

According to a fifth aspect of the present disclosure, there is provided a computer program, including computer-readable codes, and when the computer-readable codes are run in an electronic apparatus, a processor in the electronic apparatus executes the method according to any one of the first aspect.

According to the embodiments of the disclosure, a first image corresponding to the region where a human object is located may be determined from a second image, and the first image are subjected to feature extraction to obtain corresponding feature maps, and then the feature maps are subjected to multi-scale feature fusion to obtain second feature maps of multiple scales, wherein a second feature map has more accurate feature information with respect to a first feature map, and the positions of the associated hand and human face in the first image may be obtained by processing the second feature maps.

It should be understood that the above general description and the following detailed description are only exemplary and explanatory, and do not limit the disclosure.

Other features and aspects of the disclosure will become apparent from the following detailed description of exemplary embodiments with reference to the accompanying drawings.

BRIEF DESCRIPTION OF THE DRAWINGS

The drawings herein are incorporated into and constitute a part of the specification, which illustrate embodiments in accordance with the disclosure and together with the specification are used to explain the technical solution of the disclosure.

DETAILED DESCRIPTION

Hereinafter, various exemplary embodiments, features and aspects of the disclosure will be described in detail with reference to the accompanying drawings. In the drawings, the same reference numerals refer to elements with the same or similar functions. Although various aspects of embodiments are shown in the drawings, the drawings are not necessarily drawn to scale unless otherwise specified.

The term "exemplary" here means "serving as an example, embodiment or illustrative". Any embodiment described herein as "exemplary" need not be interpreted as superior or better than other embodiments.

The term "and/or" herein is only an association relationship describing the associated objects, which means that there can be three kinds of relationships, for example, A and/or B can mean A alone; A and B; and B alone. In addition, the term "at least one" herein means any one of many or any combination of at least two of many, for example, including at least one of A, B and C may mean including any one or more elements selected from the group consisting of A, B and C.

In addition, in order to better illustrate the disclosure, numerous details are given in the following detailed description. It should be understood by those skilled in the art that the disclosure can still be implemented without certain details. In some examples, methods, means, elements and circuits well known to those skilled in the art have not been described in detail in order to highlight the main idea of the disclosure.

Embodiments of the disclosure provide a human face and hand association detecting method, which can be applied to any image processing device, for example, the method can be applied to a terminal device or a server, or can also be applied to other processing devices, wherein the terminal device may be user equipment (UE), mobile device, user terminal, terminal, cellular phone, cordless phone, personal digital assistant (PDA), handheld device, computing device, vehicle-mounted device, wearable device, etc. In some possible implementation modes, the human face and hand association detecting method can be implemented by calling computer-readable instructions stored in a memory by a processor.

Figure 1:
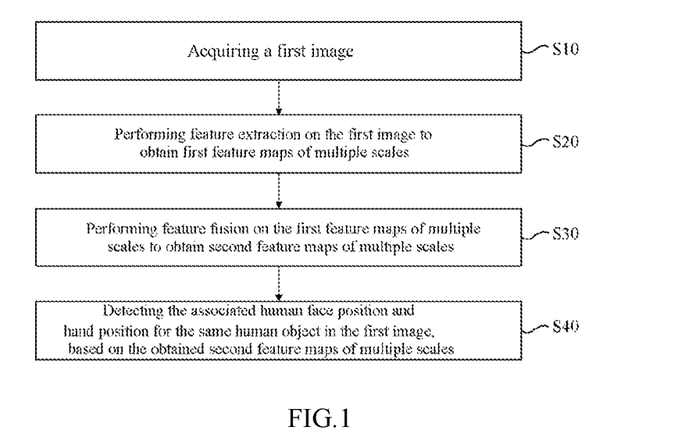
FIG. 1 shows a flowchart of a human face and hand association detecting method according to an embodiment of the disclosure.

FIG. 1 shows a flowchart of a human face and hand association detecting method according to an embodiment of the disclosure. As shown in FIG. 1, the human face and hand association detecting method includes the following.

S10: acquiring a first image.

In some possible implementation modes, the first image may be an image of a human object, which may include at least one human face and at least one hand. The embodiments of the disclosure may detect the association between the hand and the human face of a human object in the first image, wherein the association means that the obtained human face and hand are those of the same human object.

In some possible implementation modes, the way to acquire the first image may include: directly acquiring the first image by an image acquisition apparatus, wherein the image acquisition apparatus may be apparatuses with an image acquisition function, such as a mobile phone, a webcam, a camera, etc. The way to acquire the first image may also include: receiving the transmitted first image from other apparatuses, or reading the first image from a memory, or the first image may also be an image frame obtained after performing frame selection from a video stream, which is not specifically limited here.

In other possible implementation modes, the first image may also be a partial image region of other image, for example, the first image may be an image region selected from other image based on received selection information, or it may also be an image region obtained by target detection, such as human body detection, which is not specifically limited here.

S20: performing feature extraction on the first image to obtain first feature maps of multiple scales.

In some possible implementation modes, the embodiments of the disclosure may perform feature extraction on the first image to obtain first feature maps of multiple scales. For example, the embodiments of the disclosure may input a first image into a feature extraction network to obtain first feature maps of multiple scales, wherein the feature extraction network may be a convolutional neural network, such as a residual network (Res-Net), through which the feature extraction of a first image is performed to obtain first feature maps of at least two scales. Alternatively, in other embodiments, other types of feature extraction networks may be used to obtain the first feature maps of multiple scales, which is not specifically limited here. Alternatively, in other possible implementation modes, the first feature maps of multiple scales may also be obtained by upsampling or downsampling the first image, for example, the corresponding first feature maps of multiple scales may be obtained by different sampling rates.

S30: performing feature fusion on the first feature maps of multiple scales to obtain second feature maps of multiple scales, wherein the scales of the second feature maps are in one-to-one correspondence with those of the first feature maps.

In some possible implementation modes, in a case that the first feature maps of multiple scales are obtained, feature fusion may be performed on the first feature maps of multiple scales to obtain second feature maps of corresponding scales. The accuracy of feature information in each second feature map can be improved by feature fusion, so as to further improve the detecting accuracy of association between the human face and hand.

In some possible implementation modes, feature fusion of the first feature maps of multiple scales may be performed through a feature pyramid network, wherein feature information of first feature maps of adjacent scales may be subjected to feature fusion, and by fusing feature information of first feature maps of small scales into feature information of first feature maps of large scales in sequence, the second feature maps fused with feature information of the first feature maps of all scales may be finally obtained.

S40: detecting the associated human face position and hand position for the same human object in the first image, based on the obtained second feature maps of multiple scales.

In some possible implementation modes, after obtaining the second feature maps of multiple scales, human face and hand association detection may be performed based on the second feature maps of multiple scales. A convolution process may be performed on at least one of the second feature maps of each scales, so as to obtain the associated face position and hand position in the first image. For example, the second feature map with the largest scale may be input to a convolution layer to perform the convolution process to obtain mask maps about face position and hand position respectively, which may include a first mask map of face position, a second mask map of left hand position, and a third mask map of right hand position. The associated face position and hand position may be determined correspondingly in the first image through the obtained mask maps.

Based on the above configuration, the embodiments of the disclosure do not need to obtain the key points of ears or wrist or analyze whether Gaussian distribution is satisfied, and can directly obtain the associated hand and human face through the multi-scale feature extraction and feature fusion of features of the first image, and thus having the advantages of simplicity, convenience and high precision.

Figure 2:
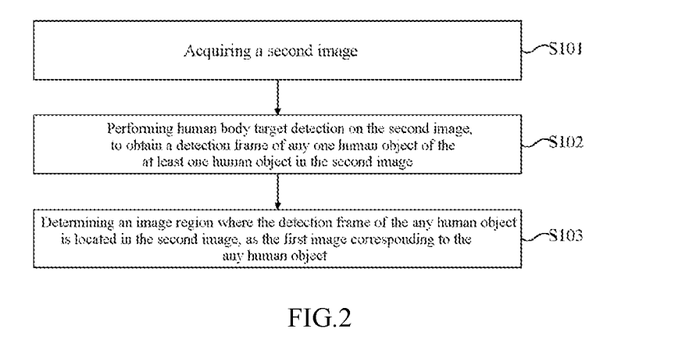
FIG. 2 shows a flowchart of step S10 in a human face and hand association detecting method according to an embodiment of the disclosure.

The process of the embodiments of the present disclosure will be described in detail with reference to the accompanying drawings. As described in the above embodiments, the first image obtained in the embodiments of the disclosure may be an image of a human object. In actual application, the obtained image may include multiple human objects. In order to improve the detecting accuracy of association between the human face and hand of the same human object, the disclosure may obtain an image region of each human object from the obtained image, and then perform feature extraction and feature fusion on each image region, respectively, and finally obtain the positions of human face and hand of each human object. FIG. 2 shows a flowchart of step S10 in a human face and hand association detecting method according to an embodiment of the disclosure. The acquiring the first image includes:

S101: acquiring a second image, the second image being an image including at least one human object.

In some possible implementation modes, the first image may be an image obtained based on a second image, wherein the second image may be an image of at least one human object. The way to acquire the second image may include: directly capturing a second image through an image capturing apparatus, wherein the image capturing apparatus may be an apparatus with the image acquisition function, such as a mobile phone, a webcam, a camera, etc. The way to acquire a second image may also include: receiving a transmitted second image from other apparatuses, or reading a second image from a memory, or the second image may also be an image frame obtained after performing frame selection from a video stream, which is not specifically limited here.

Figure 3:
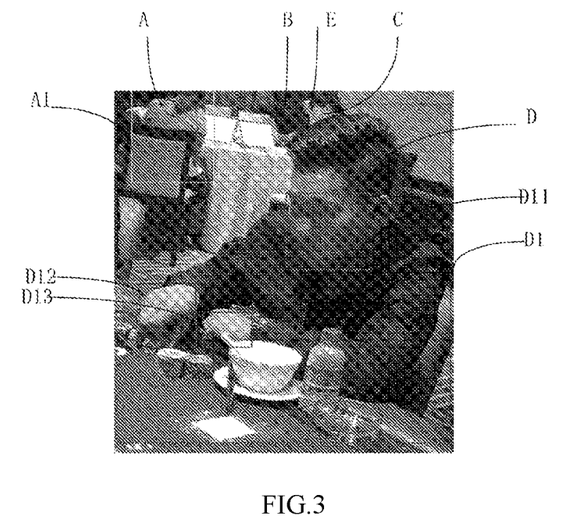
FIG. 3 shows a schematic diagram of a second image according to an embodiment of the disclosure.

FIG. 3 shows a schematic diagram of a second image according to an embodiment of the present disclosure. The second image may include five human objects A, B, C, D and E. In other embodiments, the second image may only include one human object, or may include other number of human objects, which is not specifically limited here.

S102: performing human target detection on the second image to obtain a detection frame of any one of the at least one human object in the second image.

In some possible implementation modes, in a case that a first image is obtained through a second image, the position of a human body region for each human object in the second image can be detected to obtain the first image corresponding to the human object. In a case that the second image includes multiple human objects, the obtained first image may include the human body region of one human object, and may also include at least a partial image of other human objects, such as at least part of the human face or hand of other objects. The embodiments of the present disclosure may obtain the hand and human face of one human object in the first image by performing a subsequent process on the first image.

As described above, the second image may include at least one human object, and the present disclosure may perform target detection on the second image, so as to implement human body region detection of the human object in the second image and obtain the detection frame of each human object.

In some possible implementation modes, the detection frame corresponding to the human object in the second image may be detected by a neural network capable of performing human target detection. The neural network may be a convolutional neural network, which may be a convolutional neural network capable of accurately identifying, after training, each human object in the image and the position region (i.e., detection frame) of the corresponding human object, such as an R-CNN network or other neural networks capable of implementing target detection, which is not specifically limited here.

As shown in FIG. 3, through target detection, a detection frame corresponding to a human body region of a human object in the image, such as the detection frame A1 of the human object A and the detection frame D1 of the human object D, are obtained. The above is only exemplary description, and the detection frames of other human objects may also be detected.

In the process of obtaining a detection frame, the detection frame of each human object in the image may be identified, and a detection frame that meets the quality requirements may also be identified. For example, for human objects B, C and D in FIG. 3, a quality value of the obtained detection frame is less than a quality threshold. In this case, the detection frames corresponding to the human objects B, C and D may be determined as detection frames that do not meet the quality requirements and deleted. The quality value of a detection frame may be a score or confidence degree relating to the detection frame obtained at the same time when the detection frame is obtained during target detection. If the score or confidence degree is greater than a quality threshold, it is determined that the detection frame meets the quality requirements. The quality threshold can be a set value, such as 80%, or other values less than 1, which is not specifically limited here.

S103: determining an image region where the detection frame of the any human object is located in the second image as the first image corresponding to the any human object.

In a case that the detection frame of each human object in a second image is obtained, the image region corresponding to the detection frame, which is in the second images, may be determined as the first image of the human object corresponding to the detection frame. For example, in the embodiment shown in FIG. 3, the detection frame A1 of the human object A and the detection frame D1 of the human object D in the second image may be obtained.

Accordingly, the image region corresponding to A1 may be determined as the first image of the human object A, and the image region corresponding to the detection frame D1 may be determined as the first image of the human object D.

Based on the above configuration, the influence of other environmental factors is removed from the first image obtained by the embodiments of the present disclosure, and the detecting accuracy may be further improved. In addition, based on the above, the image region (first image) for one human object may be obtained from a second image. Although the obtained first image is an image for one human object, in actual application, the first image obtained in this case may also include at least part of other human objects as the human objects included in the second image may be close to each other. For example, the detection frame D1 in FIG. 3 may include part of the human face of the human object C besides the human object D. According to the present disclosure, the positions of human face and hand of the same human object in a first image may be obtained through subsequent processing.

Figure 4:
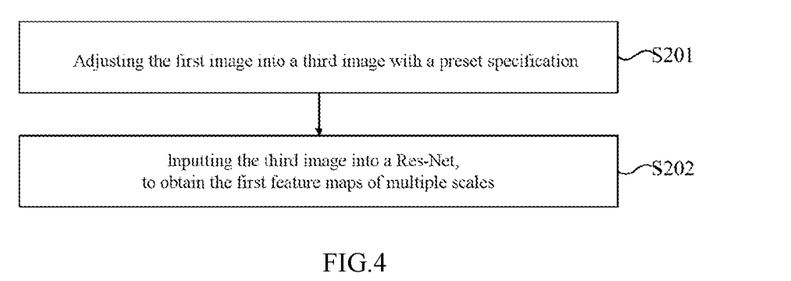
FIG. 4 shows a flowchart of step S20 in a human face and hand association detecting method according to an embodiment of the disclosure.

FIG. 4 shows a flowchart of step S20 in a human face and hand association detecting method according to an embodiment of the present disclosure. The performing feature extraction on a first image to obtain the first feature maps of multiple scales includes:

S201: adjusting the first image into a third image of a preset specification.

In some possible implementation modes, the scales of the obtained first images may be different, and the embodiments of the present disclosure may adjust the obtained first images into the same scale, that is, into a preset scale, so that subsequent feature extraction can be performed on the images of the same scale. The preset scale of the embodiments of the present disclosure may be determined according to the design and configuration of the network, for example, the preset scale of the embodiments of the present disclosure may be 256*192 (height*width), but it is not a specific limitation of the disclosure.

The way of adjusting the image scale may include at least one of upsampling, downsampling or image interpolation, which is not specifically limited here. The third image of a preset scale may also be obtained by other means.

S202: inputting the third image into a Res-Net to obtain the first feature maps of multiple scales.

In a case that the third image of the preset scale is obtained, feature extraction may be performed on the third image, for example, the third image may be input to the Res-Net (such as Resnet 50) to perform feature extraction of the image, to obtain the first feature maps of different scales. The first feature maps of different scales may be output through different convolution layers of the Res-Net.

Alternatively, in other implementation modes, the first feature maps of multiple scales may also be obtained through other feature extraction networks, such as feature pyramid networks, or through way of upsampling or downsampling. For example, the sampling frequency of the embodiments of the disclosure may be ⅛, 1/16, 1/32, etc., which is not limited here.

In some possible implementation modes, the relationship among the obtained first feature maps is as follows: $L(C_{i-1})=2^{k_1} \Box L(C_i)$ and , $W(C_{i-1})=2^{k_1} \Box W(C_i)$, where $C_i$ represents each first feature map, $L(C_i)$ represents the length of the first feature map $C_i$, $W(C_i)$ represents the width of the first feature map $C_i$, $k_1$ is an integer greater than or equal to 1, i is a variable, the range of which is [2,n], and n is the number of the first feature maps. That is, the relationship between the length of each first feature map and the relationship between the width of each first feature map in the embodiments of the present disclosure respectively are multiples of k1-th power of 2.

In an example, the number of the first feature maps obtained in the disclosure may be four, which may be respectively represented as first feature maps $C_1$, $C_2$, $C_3$ and $C_4$, wherein the length and width of the first feature map $C_1$ may be twice those of the first feature map $C_2$ respectively, the length and width of the first feature map $C_2$ may be twice those of the first feature map $C_3$ respectively, and the length and width of the first feature map $C_3$ may be twice those of the first feature map $C_4$ respectively. In the embodiments of the present disclosure, the multiples in length and width between $C_1$ and $C_2$, between $C_2$ and $C_3$, and between $C_3$ and $C_4$ are the same, that is, k1 is 1. In other embodiments, k1 may have different values, for example, the length and width of the first feature map $C_1$ may be twice those of the first feature map $C_2$ respectively, the length and width of the first feature map $C_2$ may be four times those of the first feature map $C_3$ respectively, and the length and width of the first feature map $C_3$ may be eight times those of the first feature map $C_4$ respectively. This is not limited here.

In a case that the first feature maps of multiple scales corresponding to the first image are obtained, feature fusion of each first feature map may be further performed to improve the accuracy of the feature information of the obtained second feature maps.

In some possible implementation modes, it is possible to perform feature fusion on the first feature maps by using a feature pyramid network (FPN). That is, the first feature maps of multiple scales may be input into the feature pyramid network, and feature fusion is performed through the feature pyramid network to obtain the second feature maps corresponding to the first feature maps. Alternatively, feature fusion may be performed in other ways, for example, the second feature maps of multiple scales may be obtained by convolution and upsampling processes. Based on the above configuration, the feature accuracy of the obtained second feature maps of multiple scales may be improved.

Figure 5:
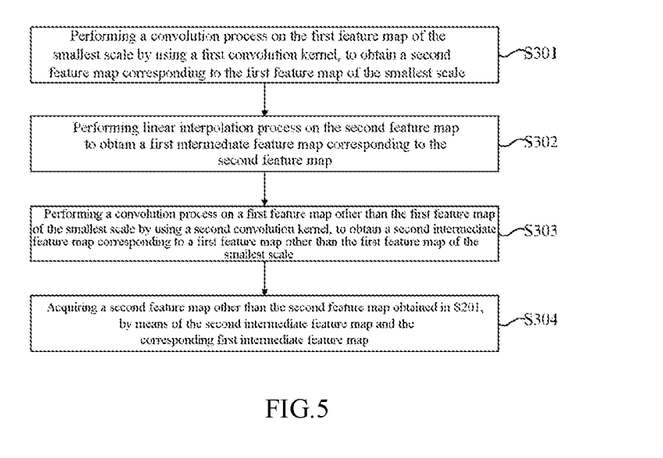
FIG. 5 shows a flowchart of step S30 in a human face and hand association detecting method according to an embodiment of the disclosure.

FIG. 5 shows a flowchart of step S30 in a human face and hand association detecting method according to an embodiment of the present disclosure. The performing feature fusion on the first feature maps of multiple scales to obtain the second feature maps of multiple scales includes:

S301: performing a convolution process on the first feature map $C_n$ by using a first convolution kernel to obtain a second feature map $F_n$ corresponding to the first feature map $C_n$, wherein the scale of the first feature map $C_n$ is the same as that of the second feature map $F_n$.

In some possible implementation modes, the first feature maps obtained in the embodiments of the present disclosure may be expressed as $\{C_1, \ldots, C_n\}$, namely n first feature maps, and $C_n$ may be the feature map with the smallest length and width, that is, the first feature map of the smallest scale. The scale of the corresponding first feature map becomes smaller as the value of n increases, for example, the scales of the above first feature maps $C_1$, $C_2$, $C_3$ and $C_4$ decrease in sequence.

During feature fusion, the second feature map $F_n$ corresponding to the first feature map $C_n$ of the smallest scale may be obtained first. For example, the convolution process may be performed on the first feature map $C_n$ through the first convolution kernel to obtain the second feature map $F_n$ corresponding to the first feature map $C_n$, wherein the scale of the first feature map $C_n$ is the same as that of the second feature map $F_n$. Similarly, the second feature map $F_n$ is also the feature map of the smallest scale in the second feature maps. By the convolution process performed through the first convolution kernel, the second feature map $F_n$ whose feature information is more accurate than that of the first feature map $C_n$ may be obtained. The first convolution kernel may be a 3*3 convolution kernel or other types of convolution kernels.

S302: performing linear interpolation processing on the second feature map $F_n$ to obtain a first intermediate feature map $F'_n$ corresponding to the second feature map $F_n$, wherein the scale of the first intermediate feature map $F'_n$ is the same as that of the first feature map $C_{n-1}$.

After obtaining the second feature map $F_n$, the second feature map $F_n$ may be used to obtain the corresponding first intermediate feature map $F'_n$. In the embodiments of the present disclosure, the first intermediate feature map $F'_n$ corresponding to the second feature map $F_n$ may be obtained by performing linear interpolation processing on the second feature map $F_n$, wherein the scale of the first intermediate feature map $F'_n$ is the same as that of the first feature map $C_{n-1}$. For example, in a case that the scale of $C_{n-1}$ is twice that of $C_n$, the length of the first intermediate feature map $F'_n$ is twice that of the second feature map $F_n$, and the width of the first intermediate feature map $F'_n$ is twice that of the second feature map $F_n$.

S303: performing a convolution process on the first feature map other than the first feature map $C_n$ by using a second convolution kernel to obtain a second intermediate feature map $C'_i$ corresponding to the first feature map $C_i$, wherein the scale of the second intermediate feature map $C'_i$ is the same as that of the first intermediate feature map $F'_{i+1}$, and i is an integer variable greater than or equal to 1 and less than n.

In some possible implementation modes, the second intermediate feature maps $C'_i \ldots C'_{n-1}$ corresponding to the first feature maps $C_1 \ldots C_{n-1}$ other than the first feature map $C_n$ may be obtained, wherein the first feature maps $C_1 \ldots C_{n-1}$ may be subjected to the convolution process by using a second convolution kernel to obtain the second intermediate feature maps $C'_1 \ldots C'_{n-1}$ in one-to-one correspondence with the first feature maps $C_1 \ldots C_{n-1}$, respectively, and wherein the second convolution kernel may be a 1*1 convolution kernel, which is not specifically limited here. The scale of each second intermediate feature map obtained by the convolution process using the second convolution kernel is the same as that of the corresponding first feature map respectively. In the embodiments of the disclosure, the second intermediate feature maps $C'_1 \ldots C'_{n-1}$ of each first feature map $C_1 \ldots C_{n-1}$ may be obtained according to the reverse order of the first feature maps $C_1 \ldots C_{n-1}$. That is, the second intermediate feature map $C'_{n-1}$ corresponding to the first feature map $C_{n-1}$ may be obtained first, then the second intermediate feature map $C'_{n-2}$ corresponding to the first feature map $C_{n-2}$ is obtained, and so on, till the second intermediate feature map $C'_1$ corresponding to the first feature map $C_1$ is obtained.

S304: obtaining a second feature map $F_i$ other than the second feature map $F_n$ by using the second intermediate feature map and the corresponding first intermediate feature map $F'_{i+1}$, wherein the first intermediate feature map $F'_{i+1}$ is obtained by performing linear interpolation on the corresponding second feature map $F_{i+1}$.

When obtaining each second intermediate feature map, or after obtaining each second intermediate feature map, other first intermediate feature maps $F'_1 \ldots F'_{n-1}$ than the first intermediate feature map $F'_n$ may also be correspondingly obtained. In the embodiments of the present disclosure, the second feature map $F_i$ corresponding to the first feature map $C_i$ in the first feature maps $C_1 \ldots C_{n-1}$ is $F_i = C'_i + F'_{i+1}$, wherein the scale (length and width) of the second intermediate feature map $C'_i$ is equal to the scale (length and width) of the first intermediate feature map $F'_{i+1}$, respectively, and the length and width of the second intermediate feature map $C'_i$ are the same as those of the first feature map $C_i$. Therefore, the length and width of the obtained second feature map $F_i$ are the length and width of the first feature map $C_i$ respectively, where i is an integer greater than or equal to 1 and less than n.

Specifically, in the embodiments of the present disclosure, the second feature map $F_i$ other than the second feature map $F_n$ may also be obtained through processing in reverse order. That is, the embodiments of the present disclosure may first obtain the first intermediate feature map $F'_{n-1}$, wherein the second feature map $F_{n-1}$ may be obtained by adding the second intermediate map $C'_{n-1}$ corresponding to the first feature map $C_{n-1}$ and the first intermediate feature map $F'_n$, wherein the length and width of the second intermediate feature map $C'_{n-1}$ are equal to those of the first intermediate feature map $F'_n$ respectively, and the length and width of the second feature map $F_{n-1}$ are the length and width of the second intermediate feature maps $C'_{n-1}$ and $F'_n$. At this point, the length and width of the second feature map $F_{n-1}$ are twice those of the second feature map $F_n$ respectively (the scale of $C_{n-1}$ is twice that of $C_n$). Further, the second feature map $F_{n-1}$ may be linearly interpolated to obtain the first intermediate feature map $F'_{n-2}$, so that the scale of $F'_{n-1}$ is the same as that of $C_{n-1}$, and then the second feature map $F'_{n-2}$ may be obtained by adding the second intermediate map $C'_{n-2}$ corresponding to the first feature map $C_{n-2}$ and the first intermediate feature map $F'_{n-1}$, wherein the length and width of the second intermediate feature map $C'_{n-2}$ are the same as those of the first intermediate feature map $F'_{n-1}$ respectively, and the length and width of the second feature map $F_{n-2}$ are the length and width of the second intermediate feature maps $C'_{n-2}$ and $F'_{n-1}$. For example, the length and width of the second feature map $F_{n-2}$ are twice those of the second feature map $F_{n-1}$ respectively. In this way, the first intermediate feature map $F'_2$ may be finally obtained, and the second feature map $F_1$ may be obtained by adding the first intermediate feature map $F'_2$ and the first feature map $C'_1$, wherein the length and width of $F_1$ are the same as those of $C_1$ respectively. Then each second feature map is obtained, and $L(F_{i-1})=2^{k_1} \Box L(F_i)$, $W(F_{i-1})=2^{k_1}\Box W(F_i)$, $L(F_n)=L(C_n)$, $W(F_n)=W(C_n)$ are satisfied.

Figure 6:
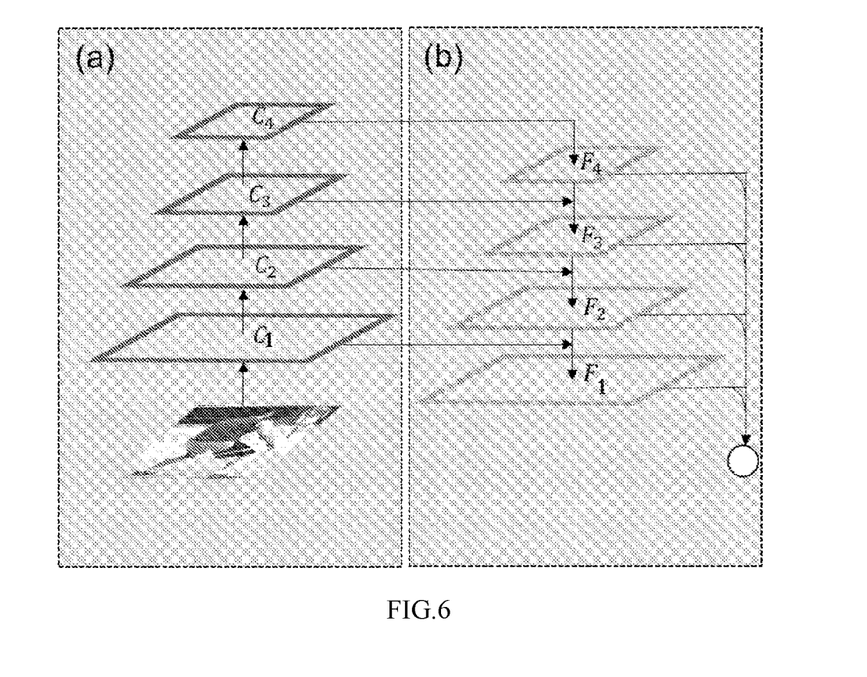
FIG. 6 shows a schematic diagram of a procedure of feature extraction and feature fusion according to an embodiment of the present disclosure.

For example, the above four first feature maps $C_1$, $C_2$, $C_3$ and $C_4$ are taken as an example for explanation. FIG. 6 shows a schematic diagram of feature extraction and feature fusion according to an embodiment of the present disclosure. Feature extraction may be performed through a ResNet a, four first feature maps $C_1$, $C_2$, $C_3$, and $C_4$ of different scales are outputted by using four convolution layers in the Res-Net respectively, and then feature fusion is performed by using a feature extraction network b, to obtain second feature maps of multiple scales. Firstly, a new feature map $F_4$ (second feature map) may be obtained from $C_4$ subject to calculation with a 3*3 first convolution kernel, wherein the length and width of $F_4$ are the same as those of $C_4$. An upsampling operation of bilinear interpolation is performed on $F_4$ to obtain a feature map whose length and width are doubled, that is, a first intermediate feature map $F'_4$. A second intermediate feature map $C'_3$ can be obtained from $C_3$ subject to calculation with a 1*1 second convolution kernel, wherein $C'_3$ and $F'_4$ have the same size. The two intermediate feature maps are added to obtain a new feature map $F_3$ (second feature map), so that the length and width of the second feature map $F_3$ are twice those of the second feature map $F_4$, respectively, and the scale of $F_3$ is the same as scale of the first feature map $C_3$. An upsampling operation of bilinear interpolation is performed on $F_3$ to obtain a feature map whose length and width are doubled, that is, a first intermediate feature map $F'_3$. A second intermediate feature map $C'_2$ is obtained from $C_2$ subject to calculation with a 1*1 second convolution kernel, wherein $C'_2$ and $F'_3$ have the same size. The two intermediate feature maps are added to obtain a new feature map $F_2$ (second feature map), so that the length and width of the second feature map $F_2$ are twice those of the second feature map $F_3$, respectively. An upsampling operation of bilinear interpolation is performed on $F_2$ to obtain a feature map whose length and width are doubled, that is, a first intermediate feature map $F'_2$. A second intermediate feature map $C'_1$ is obtained from $C_1$ subject to calculation with a 1*1 second convolution kernel, wherein $C'_1$ and $F'_2$ have the same size. The two feature maps are added to obtain a new feature map $F_1$ (second feature map), so that the length and width of the second feature map $F_1$ are twice those of the second feature map $F_2$, respectively. After FPN, four second feature maps of different scales are also obtained, which are denoted as $F_1$, $F_2$, $F_3$ and $F_4$ respectively. Furthermore, the multiple in length and width between $F_1$ and $F_2$ is the same as that between $C_1$ and $C_2$, the multiple in length and width between $F_2$ and $F_3$ is the same as that between $C_2$ and $C_3$, and the multiple in length and width between $F_3$ and $F_4$ is the same as that between $C_3$ and $C_4$.

Based on the above configuration, the feature information of different scales may be fused to further improve the feature accuracy. In this way, the second feature maps respectively corresponding to the first feature maps of multiple scales may be obtained, and the accuracy of the feature information of the second feature maps is improved relative to that of the first feature maps.

Figure 7:
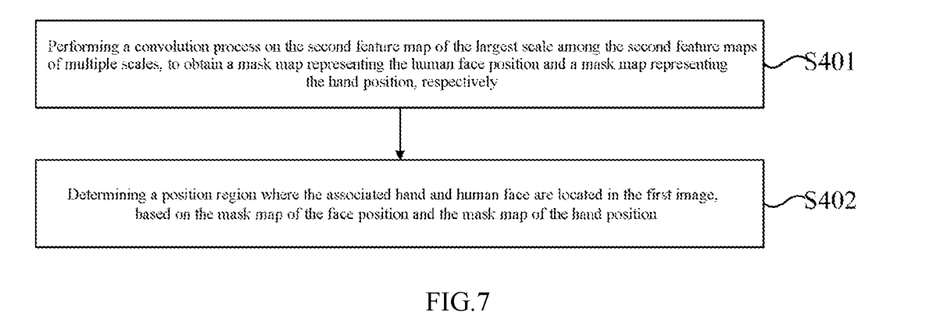
FIG. 7 shows a flowchart of step S40 in a human face and hand association detecting method according to an embodiment of the disclosure.

After a second feature map is obtained, the positions of human face and hand for the same human object in a first image may be obtained according to the second feature map. FIG. 7 shows a flowchart of step S40 in a human face and hand association detecting method according to an embodiment of the present disclosure. As described in the above embodiments, the detecting the positions of associated human face and hand for the same human object in the first image based on the obtained second feature maps of multiple scales in the embodiments of the present disclosure includes:

S401: performing a convolution process on the second feature map of the largest scale among the second feature maps of multiple scales, to obtain a mask map representing the face position and a mask map representing the hand position respectively.

In some possible implementation modes, at least one of the obtained second feature maps of multiple scales may be input into a convolution layer, further feature fusion is performed on the at least one second feature map, and the mask map of the human face position and the mask map of the hand position of the same human object corresponding to the first image is correspondingly generated. Because the second feature map of the largest scale fuses the feature information of the feature maps of all scales, the present disclosure may input the second feature map into a convolution layer to perform the association detection of the hand position and the human face position. The elements in the obtained mask map may be expressed as being composed of 1 and 0, where 1 represents the position region of the hand or human face. For example, the embodiments of the present disclosure may obtain a first mask map of the human face position, a second mask map of the left hand position and a third mask map of the right hand position of the same human object, and through the position of element 1 in each mask map, the positions of the associated human face and hand in the first image may be obtained.

In some possible implementation modes, if only one of the left hand and the right hand can be detected, the mask map corresponding to the undetected hand may be an all-zero mask map. Alternatively, if no associated face and hand can be detected, the output mask map may also be an all-zero mask map.

In some possible implementation modes, the obtained mask map may be correspondingly associated with a human object identifier and a type identifier, wherein the human object identifier is used to distinguish different human objects, and different human objects may have different human object identifiers, and the type identifier may be used to represent the human face position, left hand position or right hand position corresponding to the mask map. Through the above-mentioned human object identifier and type identifier, the human object corresponding to each mask map and whether the mask map corresponds to the human face or hand (left hand or right hand) can be determined apparently.

S402: determining a position region where the associated hand and human face are located in the first image based on the mask map of the human face position and the mask map of the hand position.

In a case that the mask maps corresponding to the associated hand and human face are obtained, the position region corresponding to the associated hand and human face in the first image is further obtained.

The scales of the first mask map and the second mask map obtained by the embodiments of the present disclosure may be the same as that of the first image, so that the human face position determined according to the mask map may be mapped to the corresponding human face image region in the first image, and the hand position determined according to the mask map may be mapped to the hand image region in the first image, thereby obtaining the position region where the associated hand and human face are located.

In some possible implementation modes, after the positions of the associated human face and hand in the first image are detected, the matched human face and hand may be highlighted in the first image based on the obtained mask maps, for example, the image regions where the mask maps are located in the first image are displayed in the form of detection frame, to prompt the associated human face and hand. As shown in FIG. 3, the human face detection frame D11 and the hand detection frames D12 and D13 associated with the human object D can be displayed in the image. Besides, the embodiments of the present disclosure may also assign the same label to the associated human face and hand, to indicate that the human face and hand are that of the same human object.

Based on the above configuration, the positions of the associated human face and hand may be conveniently predicted and expressed.

In some possible implementation modes, the positions of the associated human face and hand obtained by the embodiments of the present disclosure may also be used to determine the posture change of the human object. For example, the first image may be obtained based on image frames in a video stream, and the change of human face position and hand position for the same human object in the image frames may be detected by the method of the embodiments of the present disclosure. Furthermore, the change of expression or gesture may be obtained by performing expression recognition on the human face position in the corresponding image frame or performing gesture recognition based on the hand position.

Figure 8:
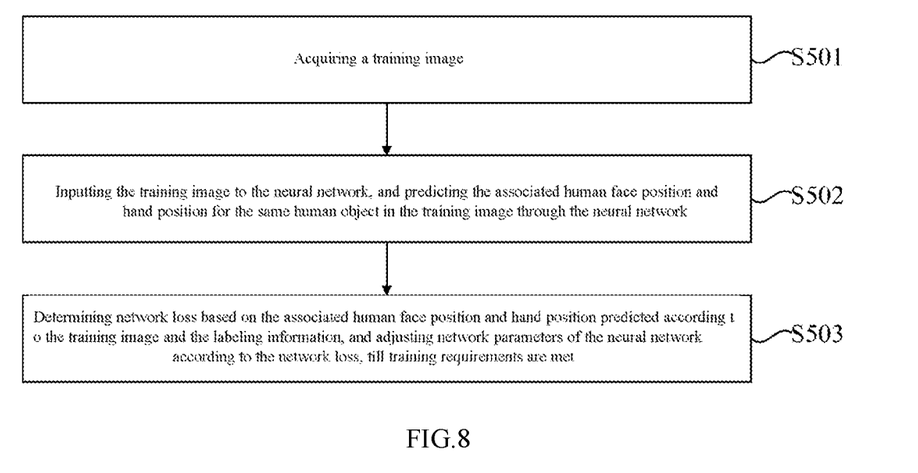
FIG. 8 shows a flowchart of training a neural network according to an embodiment of the disclosure.

As described in the above embodiments, the human face and hand association detecting method in the embodiments of the present disclosure may be applied to a neural network, such as a convolutional neural network. For example, the above convolutional neural network may be constructed by a Res-Net and a pyramid network. According to the present disclosure, a neural network can be trained to obtain a neural network meeting the precision requirement. FIG. 8 shows a flowchart of training a neural network according to an embodiment of the present disclosure. The training the neural network may include:

S501: acquiring a training image, wherein the training image is an image including a human object, and the training image has labeling information of actually associated human face position and hand position.

In some possible implementation modes, the training image may be an image of one human object, and the training image may also include part of the human faces or the hands of other human objects, so that the training accuracy may be improved. There are a plurality of training images, and the number of the training images is not limited here.

In some possible implementation modes, a training image may be associated with real labeling information to supervise the training of the neural network. Each training image has the labeling information of actually associated human face position and hand position, which is used to represent the human face position and hand position (left hand and right hand) for the same human object in the training image. The labeling information may be expressed in the form of labeling frames, or expressed in the form of position coordinates, or expressed as mask maps of actually associated hand position and human face position. It may be an embodiment of the present disclosure, as long as the associated human face position and hand position in the training image can be determined.

S502: inputting the training image to the neural network, and predicting the associated human face position and hand position for the same human object in the training image through the neural network.

In some possible implementation modes, the training image may be input to the neural network to perform feature extraction, feature fusion, and detection of associated hand and human face positions.

For example, multi-scale feature extraction of the training image may be performed by a feature extraction network such as Res-Net, to obtain first prediction feature maps of multiple scales. Please refer to the description of the above embodiments for the specific feature extraction process, which will not be repeated here.

After the first feature maps of multiple scales are obtained, feature fusion may be performed on the first prediction feature maps of multiple scales, for example, a feature pyramid network (FPN) is used to perform feature fusion on the first prediction feature maps, to obtain second prediction feature maps of multiple scales, wherein the specific process of feature fusion is not repeated here and can be understood by referring to the process of the above embodiments.

In a case that a plurality of second prediction feature maps are obtained, a convolution process may be performed on each second prediction feature map, to obtain prediction mask maps of the positions of associated human face and hand predicted based on each second prediction feature map.

S503: determining network loss based on the associated human face position and hand position predicted with respect to the training image and the labeling information, and adjusting network parameters of the neural network according to the network loss till the training requirements are met.

According to the embodiments of the present disclosure, the network loss may be obtained according to the difference between the human face prediction mask map and the hand prediction mask map obtained by predicting based on the second prediction feature map of each scale and the mask maps corresponding to real human face and hand, wherein the network loss may be determined through a logarithmic loss function. For example, in the embodiments of the present disclosure, the loss between the prediction mask maps obtained based on the second prediction feature map of each scale and the labeled real mask maps may be obtained by processing directly using the logarithmic loss function, and the loss is used as the network loss to adjust the parameters of the neural network. That is to say, the loss corresponding to each scale may be regarded as the network loss to separately optimize the parameters of the neural network.

Alternatively, in other implementation modes, the embodiments of the present disclosure may determine sub-network loss between the human face prediction mask map and the hand prediction mask map obtained based on the second prediction feature map of each scale and the mask maps corresponding to the real labeling information through the logarithmic loss function, and determine the network loss by using the weighted sum of the sub-network loss obtained corresponding to each scale. That is to say, the network loss may be determined according to the weighted sum of loss corresponding to each scale, so as to optimize the parameters of the neural network together.

In addition, because the embodiments of the present disclosure may obtain the network loss based on the prediction result of each second prediction feature map, the accuracy of the prediction result of the second prediction feature map through the obtained neural network is relatively high regardless of the scale of the second prediction feature map, and thus the detecting accuracy of the whole neural network can be improved.

In a case that the network loss is obtained, the network parameters of the neural network are adjusted based on the comparison result between the network loss and a loss threshold. For example, in a case that the network loss is greater than a loss threshold, the parameters of the neural network are adjusted in a feedback manner, such as adjusting the parameters of the feature extraction network, the feature pyramid network and convolution layers to obtain mask maps, and the training images are processed again, till the obtained network loss is less than the loss threshold. In a case that the network loss is less than a loss threshold, it may be determined that the neural network meets the training requirements, and then the training may be terminated. Based on the above configuration, the optimal training of the neural network may be realized, and the network detecting accuracy may be guaranteed.

To sum up, according to the embodiments of the present disclosure, a first image corresponding to the region where a human object is located can be determined from a second image, and the first image is subjected to feature extraction to obtain corresponding feature maps, and then the feature maps are subjected to multi-scale feature fusion to obtain second feature maps of multiple scales, wherein the second feature maps have more accurate feature information relative to first feature maps, and the positions of the associated hand and human face in the first image may be obtained by processing the second feature maps, thus improving the detecting accuracy of the human face and hand. In addition, the technical solution of the embodiments of the present disclosure does not need to acquire the key points of ears or wrist, and may directly obtain the positions of the associated hand and human face in the image, thus having the advantages of simplicity, convenience and high precision.

It can be understood by those skilled in the art that in the above method of the specific embodiment, the order of each step described does not mean a strict execution order which constitutes any limitation on the implementation process, but the specific execution order of each step should be determined by its function and possible internal logic.

It can be understood that all the above-mentioned method embodiments in the disclosure may be combined with one another to form a combined embodiment without violating the principle and logic. Due to the limitation of space, no details are described here.

In addition, the disclosure also provides a human face and hand association detecting device, an electronic apparatus, a computer-readable storage medium and a program, all of which can be used to implement any face and hand association detecting method provided by the disclosure. For the corresponding technical solution and description, please refer to the corresponding description in the method section, which is not repeated here.

Figure 9:
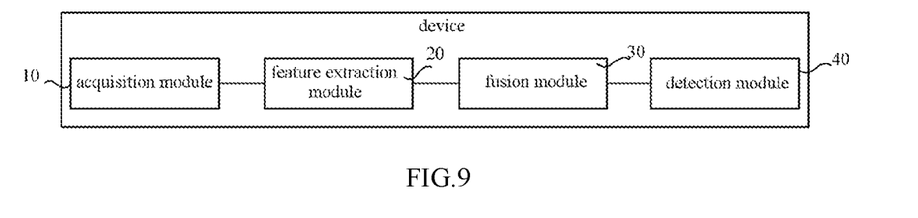
FIG. 9 shows a block diagram of a human face and hand association detecting device according to an embodiment of the disclosure.

FIG. 9 shows a block diagram of a human face and hand association detecting device according to an embodiment of the present disclosure. As shown in FIG. 9, the human face and hand association detecting device includes:

an acquisition module 10, configured to acquire a first image, wherein the first image is an image of a human object;

a feature extraction module 20, configured to perform feature extraction on the first image to obtain first feature maps of multiple scales;

a fusion module 30, configured to perform feature fusion on the first feature maps of multiple scales to obtain second feature maps of multiple scales, wherein the scales of the second feature maps are in one-to-one correspondence with those of the first feature maps; and a detection module 40, configured to detect the associated human face position and hand position for the same human object in the first image based on the obtained second feature maps of multiple scales.

In some possible implementation modes, the acquisition module comprises:

an acquisition unit, configured to acquire a second image, wherein the second image is an image including at least one human object;

a target detection unit, configured to perform human target detection on the second image, to obtain a detection frame of any one of the at least one human object in the second image; and a determination unit, configured to determine an image region, which is corresponding to the detection frame of the any human object, in the second image as the first image of the any human object.

In some possible implementation modes, the feature extraction module is further configured to acquire the second image, the second image being an image including at least one human object;

perform human target detection on the second image to obtain a detection frame of any one of the at least one human object in the second image; and determine an image region, which corresponds to the detection frame of the any human object, in the second image as the first image of the any human object.

In some possible implementation modes, the fusion unit is further configured to input the first feature maps of multiple scales into a feature pyramid network, and perform the feature fusion through the feature pyramid network. to obtain the second feature maps of multiple scales.

In some possible implementation modes, in a descending order of scales, the plurality of first feature maps are expressed as $\{C_1, \ldots, C_n\}$, where n represents the number of the first feature maps, and n is an integer greater than 1.

The fusion module is further configured to perform a convolution process on the first feature map $C_n$ by using a first convolution kernel, to obtain a second feature map $F_n$ corresponding to the first feature map $C_n$, wherein the scale of the first feature map $C_n$ is the same as that of the second feature map $F_n$;

perform linear interpolation process on the second feature map $F_n$ to obtain a first intermediate feature map $F'_n$ corresponding to the second feature map $F_n$, wherein the scale of the first intermediate feature map $F'_n$ is the same as that of the first feature map $C_{n-1}$;

perform a convolution process on the first feature map $C_i$ other than the first feature map $C_n$ by using a second convolution kernel, to obtain a second intermediate feature map $C'_i$ corresponding to the first feature map $C_i$, wherein the scale of the second intermediate feature map $C'_i$ is the same as that of the first intermediate feature map $F'_{i+1}$, and i is an integer variable greater than or equal to 1 and less than n; and obtain a second feature map $F_i$ other than the second feature map $F_n$ by means of the second intermediate feature map $C'_i$ and the corresponding first intermediate feature map $F'_{i+1}$ wherein the first intermediate feature map $F'_{i+1}$ is obtained by making the corresponding second feature map $F_{i+1}$ subjected to linear interpolation.

In some possible implementation modes, the fusion module is further configured to add the second intermediate feature map $C'_i$ and the corresponding first intermediate feature map $F'_{i+1}$, to obtain the second feature map $F_i$.

In some possible implementation modes, the detection module is further configured to perform a convolution process on the second feature map of the largest scale among the second feature maps of multiple scales, to obtain a mask map representing the human face position and a mask map representing the hand position, respectively; and determine position regions where the associated hand and human face are located in the first image, based on the mask map of the human face position and the mask map of the hand position.

In some possible implementation modes, the scale relationship among first feature maps of multiple scales is as follows: $L(C_{i-1})=2^{k_1}\Box L(C_i)$ and $W(C_{i-1})=2^{k_1}\Box W(C_i)$, wherein $C_i$ represents each first feature map, $L(C_i)$ represents the length of the first feature map $C_i$, $W(C_i)$ represents the width of the first feature map $C_i$, $k_1$ is an integer greater than or equal to 1, i is a variable, the range of which is [2,n], and n represents the number of the first feature maps.

In some possible implementation modes, the device further includes at least one of a display module and an allocation module, wherein the display module is configured to highlight the associated hand and human face in the first image; and the allocation module is configured to allocate the same label to the associated human face position and hand position detected in the first image.

In some possible implementation modes, the device includes a neural network, and the feature extraction module, the fusion module and the detection module apply the neural network.

The device further includes a training module configured to train the neural network, wherein the steps of training the neural network includes:

acquiring a training image, wherein the training image is an image including a human object, and the training image has the labeling information of actually associated human face position and hand position;

inputting the training image to the neural network, and predicting the associated human face position and hand position for the same human object in the training image through the neural network; and determining network loss based on the predicted associated human face position and hand position and the labeling information, and adjusting network parameters of the neural network according to the network loss, till the training requirements are met.

In some embodiments, the functions or modules of the device provided by the embodiment of the present disclosure may be used to execute the methods described in the above method embodiments. Please refer to the description of the above method embodiments for specific implementation, which is not repeated here for brevity.

The embodiments of the present disclosure also provide a computer-readable storage medium on which computer program instructions are stored, and the computer program instructions, when executed by a processor, implement the above method. The computer-readable storage medium may be a nonvolatile computer-readable storage medium.

The embodiments of the present disclosure also provide an electronic apparatus, which includes a processor and a memory for storing processor-executable instructions, wherein the processor is configured to execute the above method.

The electronic apparatus may be provided as a terminal, a server or any other type of apparatus.

Figure 10:
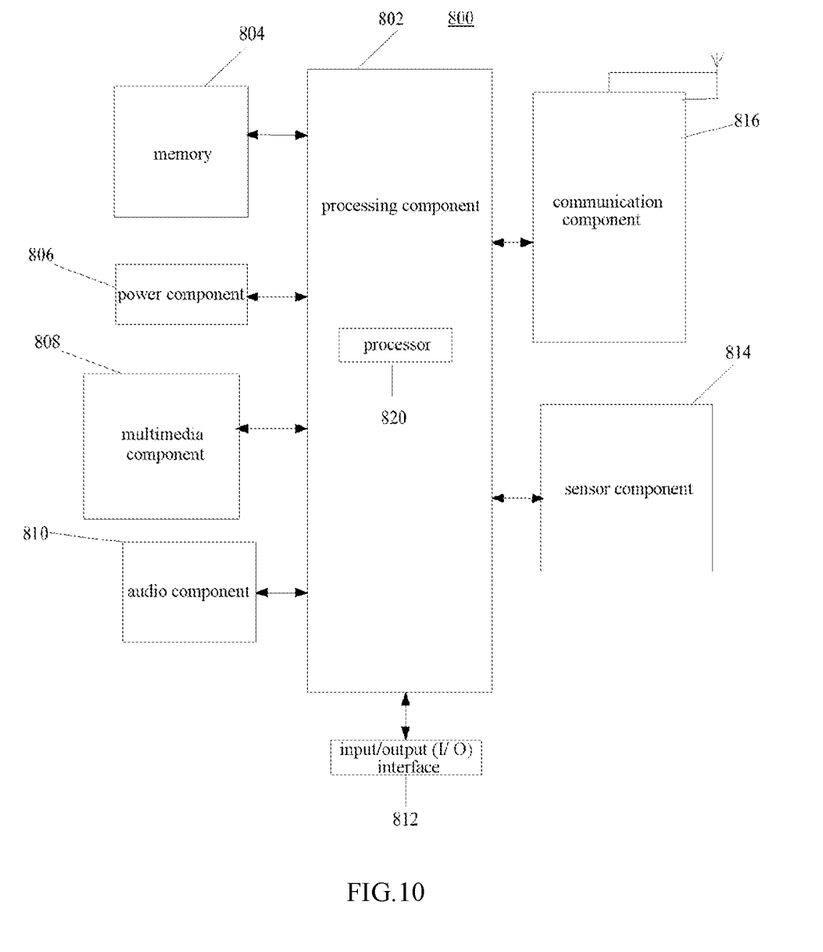
FIG. 10 shows a block diagram of an electronic apparatus according to an embodiment of the disclosure.

FIG. 10 shows a block diagram of an electronic apparatus according to an embodiment of the disclosure. For example, an electronic apparatus 800 can be a mobile phone, a computer, a digital broadcasting terminal, a messaging device, a game console, a tablet device, a medical device, a fitness device, a personal digital assistant and the like.

Referring to FIG. 10, the electronic apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operation of the electronic apparatus 800, such as operations associated with display, telephone calls, data communication, camera operations, and recording operations. The processing component 802 may include one or more processors 820 to execute instructions, so as to complete all or part of the steps of the method described above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the electronic apparatus 800. Examples of such data include instructions for any application or method running on the electronic apparatus 800, contact data, phone book data, messages, pictures, videos, etc. The memory 804 may be implemented by any type of volatile or nonvolatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk.

The power component 806 provides power for various components of the electronic apparatus 800. The power component 806 may include a power management system, one or more power supplies, and other components associated with generating, managing, and distributing power for the electronic apparatus 800.

The multimedia component 808 includes a screen which provides an output interface between the electronic apparatus 800 and a user. In some embodiments, the screen may include a Liquid Crystal Display (LCD) and a Touch Panel (TP). If the screen includes a touch panel, the screen may be implemented as a touch screen so as to receive an input signal from the user. The touch panel includes one or more touch sensors to sense touch, sliding, and gestures on the touch panel. The touch sensor may not only sense the boundary of the touch or sliding, but also detect the duration and pressure related to the touch or sliding. In some embodiments, the multimedia component 808 includes a front camera and/or a rear camera. When the electronic apparatus 800 is in an operation mode, such as a shooting mode or a video mode, the front camera and/or the rear camera may receive external multimedia data. The front camera and rear camera each can be a fixed optical lens system or have a focal length and optical zoom capability.

The audio component 810 is configured to output and/or input audio signals. For example, the audio component 810 includes a microphone (MIC) configured to receive external audio signals when the electronic apparatus 800 is in an operating mode, such as a call mode, a recording mode, and a voice recognition mode. The received audio signals may be further stored in the memory 804 or transmitted via the communication component 816. In some embodiments, the audio component 810 further includes a speaker for outputting the audio signals.

The I/O interface 812 provides an interface between the processing component 802 and peripheral interface modules, which may be keyboards, click wheels, buttons, etc. These buttons may include, but are not limited to, a home button, a volume button, a start button, and a lock button.

The sensor component 814 includes one or more sensors configured to provide state evaluation for the electronic apparatus 800 from various aspects. For example, the sensor component 814 may detect the open/closed state of the electronic apparatus 800, and the relative positioning of the components, such as a display and keypad of the electronic apparatus 800; and the sensor component 814 may also detect the position change of the electronic apparatus 800 or a component of the electronic apparatus 800, the presence or absence of user contact with the electronic apparatus 800, the orientation or acceleration/deceleration of the electronic apparatus 800, and the temperature change of the electronic apparatus 800. The sensor component 814 may include a proximity sensor configured to detect the presence of nearby objects without any physical contact. The sensor component 814 may also include light sensors, such as CMOS or CCD image sensors, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the electronic apparatus 800 and other apparatus. The electronic apparatus 800 may access a wireless network based on a communication standard, such as WiFi, 2G or 3G, or a combination thereof. In an exemplary embodiment, the communication component 816 receives a broadcast signal or broadcast related information from an external broadcast management system via a broadcast channel. In an exemplary embodiment, the communication component 816 further includes a Near Field Communication (NFC) module to facilitate short-range communication. For example, the NFC module can be implemented based on the Radio Frequency Identification (RFID) technology, the Infrared Data Association (IrDA) technology, the Ultra-Wideband (UWB) technology, the Bluetooth (BT) technology and other technologies.

In an exemplary embodiment, the electronic apparatus 800 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements for performing the above-described methods.

In an exemplary embodiment, there is provided a non-volatile computer-readable storage medium, such as a memory 804 including computer program instructions, which can be executed by the processors 820 of the electronic apparatus 800 to complete the above method.

Figure 11:
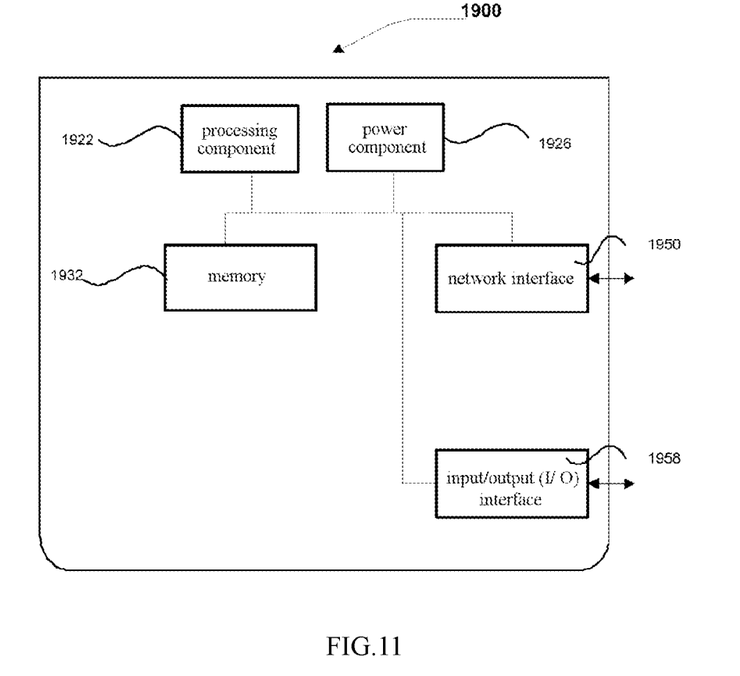
FIG. 11 shows a block diagram of another electronic apparatus according to an embodiment of the disclosure.

FIG. 11 shows a block diagram of another electronic apparatus according to an embodiment of the disclosure. For example, an electronic apparatus 1900 may be provided as a server. Referring to FIG. 11, the electronic apparatus 1900 includes a processing component 1922, which further includes one or more processors, and memory resources represented by a memory 1932 for storing instructions, such as application programs, that can be executed by the processing component 1922. The application programs stored in the memory 1932 may include one or more modules, each of which corresponds to a set of instructions. In addition, the processing component 1922 is configured to execute instructions to perform the above method.

The electronic apparatus 1900 may further include a power component 1926 configured to perform power management of the electronic apparatus 1900, a wired or wireless network interface 1950 configured to connect the electronic apparatus 1900 to a network, and an input/output (I/O) interface 1958. The electronic apparatus 1900 may operate based on an operating system stored in the memory 1932, such as Windows Server™, Mac OS X™, Unix™, Linux™, FreeBSD™ or the like.

In an exemplary embodiment, there is further provided a non-volatile computer-readable storage medium, such as a memory 1932 including computer program instructions, which can be executed by the processing component 1922 of the electronic apparatus 1900 to complete the above method.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A human face and hand association detecting method, comprising:
    acquiring a first image, the first image being an image of a human object;
    performing feature extraction on the first image to obtain first feature maps of multiple scales;
    performing feature fusion on the first feature maps of multiple scales to obtain second feature maps of multiple scales, wherein the scales of the second feature maps are in one-to-one correspondence with the scales of the first feature maps; and
    detecting associated human face position and hand position for the same human object in the first image based on the obtained second feature maps of multiple scales,
    wherein the detecting associated human face position and hand position for the same human object in the first image based on the obtained second feature maps of multiple scales comprises:
    performing a convolution process on at least one of the second feature maps of multiple scales to obtain associated human face position and hand position for the same human object in the first image.

2. The method according to claim 1, wherein acquiring the first image comprises:
    acquiring a second image, the second image being an image including at least one human object;
    performing human body target detection on the second image to obtain a detection frame of any one human object of the at least one human object in the second image; and
    determining an image region, which corresponds to the detection frame of the any one human object, in the second image as the first image of the any one human object.

3. The method according to claim 1, wherein performing feature extraction on the first image to obtain the first feature maps of multiple scales comprises:
    adjusting the first image into a third image of a preset scale; and
    inputting the third image into a Res-Net to obtain the first feature maps of multiple scales.

4. The method according to claim 1, wherein performing feature fusion on the first feature maps of multiple scales to obtain the second feature maps of multiple scales comprises:
    inputting the first feature maps of multiple scales into a feature pyramid network, and performing the feature fusion through the feature pyramid network, to obtain the second feature maps of multiple scales.

5. The method according to claim 1, wherein, in a descending order of scales, a plurality of first feature maps are expressed as $\{C_1, \ldots, C_n\}$, wherein n represents the number of the first feature maps, and n is an integer greater than 1; and
    wherein performing feature fusion on the first feature maps of multiple scales to obtain the second feature maps of multiple scales comprises:
    performing a convolution process on a first feature map $C_n$ by using a first convolution kernel, to obtain a second feature map $F_n$ corresponding to the first feature map $C_n$, wherein the scale of the first feature map $C_n$ is the same as the scale of the second feature map $F_n$;
    performing a linear interpolation process on the second feature map $F_n$ to obtain a first intermediate feature map $F'_n$ corresponding to the second feature map $F_n$, wherein the scale of the first intermediate feature map $F'_n$ is the same as the scale of a first feature map $C_{n-1}$;
    performing a convolution process on a first feature map $C_i$ other than the first feature map $C_n$ by using a second convolution kernel, to obtain a second intermediate feature map $C'_i$ corresponding to the first feature map $C_i$, wherein the scale of the second intermediate feature map $C'_i$ is the same as the scale of a first intermediate feature map $F'_{i+1}$, wherein i is an integer variable greater than or equal to 1 and less than n; and obtaining a second feature map $F_i$ other than the second feature map $F_n$ by using the second intermediate feature map $C_i$ and the corresponding first intermediate feature map $F'_{i+1}$, wherein the first intermediate feature map $F'_{i+1}$ is obtained by making the corresponding second feature map $F_{i+1}$ subjected to a linear interpolation.

6. The method according to claim 5, wherein obtaining the second feature map $F_i$ other than the second feature map $F_n$ by using the second intermediate feature map $C'_i$ and the corresponding first intermediate feature map $F'_{i+1}$ comprises:

adding the second intermediate feature map $C'_i$ and the corresponding first intermediate feature map $F'_{i+1}$ to obtain the second feature map $F_i$.

7. The method according to claim 1, wherein detecting the associated human face position and hand position for the same human object in the first image, based on the obtained second feature maps of multiple scales comprises:

performing a convolution process on the second feature map of the largest scale among the second feature maps of multiple scales, to obtain a mask map representing the human face position and a mask map representing the hand position, respectively; and determining a position region where the associated hand and human face are located in the first image, based on the mask map of the human face position and the mask map of the hand position.

8. The method according to claim 1, wherein the method further comprises at least one of the following:

highlighting the associated hand and human face in the first image; and allocating the same label to the associated human face position and hand position detected in the first image.

9. The method according to claim 1, wherein the method is implemented through a neural network, and steps of training the neural network comprises:

acquiring a training image, wherein the training image is an image including a human object, and the training image has labeling information of actually associated human face position and hand position;

inputting the training image to the neural network, and predicting associated human face position and hand position for the same human object in the training image through the neural network; and determining network loss based on the predicted associated human face position and hand position and the labeling information, and adjusting network parameters of the neural network according to the network loss, till training requirements are met.

10. The method according to claim 7, wherein the method further comprises at least one of the following:

highlighting the associated hand and human face in the first image; and allocating the same label to the associated human face position and hand position detected in the first image.

11. A human face and hand association detecting device, comprising:

a processor; and a memory configured to store processor-executable instructions, wherein the processor is configured to invoke the instructions stored in the memory, so as to:

acquire a first image, the first image being an image of a human object;

perform feature extraction on the first image to obtain first feature maps of multiple scales;

perform feature fusion on the first feature maps of multiple scales to obtain second feature maps of multiple scales, wherein the scales of the second feature maps are in one-to-one correspondence with the scales of the first feature maps; and detect associated human face position and hand position for the same human object in the first image based on the obtained second feature maps of multiple scales, wherein detecting associated human face position and hand position for the same human object in the first image based on the obtained second feature maps of multiple scales comprises:

performing a convolution process on at least one of the second feature maps of multiple scales to obtain associated human face position and hand position for the same human object in the first image.

12. The device according to claim 11, wherein acquiring the first image comprises:

acquiring a second image, the second image being an image including at least one human object;

performing human body target detection on the second image, to obtain a detection frame of any one human object of the at least one human object in the second image; and determining an image region, which corresponds to the detection frame of the any one human object, in the second image as the first image of the any one human object.

13. The device according to claim 11, wherein performing feature extraction on the first image to obtain the first feature maps of multiple scales further comprises:

adjusting the first image to a third image of a preset scale; and inputting the third image into a Res-Net to obtain the first feature maps of multiple scales.

14. The device according to claim 11, wherein performing feature fusion on the first feature maps of multiple scales to obtain the second feature maps of multiple scales further comprises:

inputting the first feature maps of multiple scales into a feature pyramid network; and performing the feature fusion through the feature pyramid network to obtain the second feature maps of multiple scales.

15. The device according to claim 11, wherein in a descending order of scales, a plurality of first feature maps are expressed as $\{C_1, \ldots, C_n\}$, where n represents the number of the first feature maps, and n is an integer greater than 1; and performing feature fusion on the first feature maps of multiple scales to obtain the second feature maps of multiple scales further comprises:

performing a convolution process on a first feature map $C_n$ by using a first convolution kernel to obtain the second feature map $F_n$ corresponding to the first feature map $C_n$, wherein the scale of the first feature map $C_n$ is the same as the scale of the second feature map $F_n$;

performing a linear interpolation process on the second feature map $F_n$ to obtain a first intermediate feature map $F'_n$ corresponding to the second feature map $F_n$, wherein the scale of the first intermediate feature map $F'_n$ is the same as the scale of a first feature map $C_{n-1}$;

performing a convolution process on a first feature map $C_i$ other than the first feature map $C_n$ by using a second convolution kernel to obtain a second intermediate feature map $C_i$ corresponding to the first feature map $C_i$, wherein the scale of the second intermediate feature map $C'_i$ is the same as the scale of a first intermediate feature map $F'_{i+1}$, wherein i is an integer variable greater than or equal to 1 and less than n; and obtaining a second feature map $F_i$ other than the second feature map $F_n$ by using the second intermediate feature map $C_i$ and the corresponding first intermediate feature map $F'_{i+1}$, wherein the first intermediate feature map $F'_{i+1}$ is obtained by making the corresponding second feature map $F'_{i+1}$ subjected to a linear interpolation.

16. The device according to claim 15, wherein performing feature fusion on the first feature maps of multiple scales to obtain the second feature maps of multiple scales further comprises adding the second intermediate feature map $C'_i$; and the corresponding first intermediate feature map $F'_{i+i}$ to obtain the second feature map $F_i$.

17. The device according to claim 11, wherein detecting the associated human face position and hand position for the same human object in the first image, based on the obtained second feature maps of multiple scales further comprises:
performing a convolution process on the second feature map of the largest scale among the second feature maps of multiple scales, to obtain a mask map representing the human face position and a mask map representing the hand position, respectively; and
determining a position region where the associated hand and human face are located in the first image, based on the mask map of the human face position and the mask map of the hand position.

18. The device according to claim 11, the processor is further configured to:
highlight the associated hand and human face in the first image; and/or,
allocate the same label to the associated human face position and hand position detected in the first image.

19. The device according to claim 11, wherein the processor is configured to apply a neural network; and
the processor is further configured to train the neural network, wherein the steps of training the neural network comprises:

acquiring a training image, wherein the training image is an image including a human object, and the training image has the labeling information of actually associated human face position and hand position;
inputting the training image to the neural network, and predicting associated human face position and hand position for the same human object in the training image through the neural network; and
determining network loss based on the predicted associated human face position and hand position and the labeling information, and adjusting network parameters of the neural network according to the network loss, till training requirements are met.

20. A non-transitory computer-readable storage medium having computer program instructions stored thereon, wherein when the computer program instructions are executed by a processor, the processor is caused to perform the operations of:
acquiring a first image, the first image being an image of a human object;
performing feature extraction on the first image to obtain first feature maps of multiple scales;
performing feature fusion on the first feature maps of multiple scales to obtain second feature maps of multiple scales, wherein the scales of the second feature maps are in one-to-one correspondence with the scales of the first feature maps; and
detecting associated human face position and hand position for the same human object in the first image based on the obtained second feature maps of multiple scales,
wherein the detecting associated human face position and hand position for the same human object in the first image based on the obtained second feature maps of multiple scales comprises:
performing a convolution process on at least one of the second feature maps of multiple scales to obtain associated human face position and hand position for the same human object in the first image.

* * * * *